United States Patent [19]
Albrecht et al.

[11] 3,910,209
[45] Oct. 7, 1975

[54] FLUIDIZED BED FURNACE HAVING FUEL AIR SUPPLY LANCE AND A FUEL AIR SUPPLY LANCE CONSTRUCTION

[75] Inventors: Erhard Albrecht, Essen; Heinz Wilhelm Oepke; Herbert Wulfmeier, both of Mulheim, all of Germany

[73] Assignee: Rheinstahl AG, Germany

[22] Filed: Nov. 8, 1974

[21] Appl. No.: 522,313

[30] Foreign Application Priority Data
Nov. 12, 1973  Germany............................ 2356487

[52] U.S. Cl. .............. 110/8 F; 34/57 R; 110/182.5; 122/6.5
[51] Int. Cl.[2] ......................... F23G 7/00; F23L 1/00
[58] Field of Search ................ 110/8 F, 28 J, 182.5; 34/57 R, 57 A; 122/6.5

[56] References Cited
UNITED STATES PATENTS

| | | | |
|---|---|---|---|
| 2,863,656 | 12/1968 | Cox............................ | 110/182.5 X |
| 3,559,623 | 2/1971 | DeCamps........................... | 122/6.5 |
| 3,772,998 | 11/1973 | Menigat................................ | 110/8 |
| 3,863,577 | 2/1975 | Steever............................... | 432/58 X |

Primary Examiner—Kenneth W. Sprague
Attorney, Agent, or Firm—McGlew and Tuttle

[57] ABSTRACT

A fluidized bed furnace for burning particularly sludges, comprises a housing having a bottom supporting a fluidized bed thereabove with wall means extending upwardly from the bottom and above the fluidized bed which define a combustion chamber thereabove. The tubular connection socket is connected into the wall means adjacent the bottom, preferably on a side thereof which is opposite to the inlet for the sludge material to be burned. A first outer tubular connection extends through the socket and is supported on, and sealed with, the socket and terminates in an inner end which extends into the furnace in the area of the fluidized bed. This first outer tube is connected to a first source of compressed air, and a second source of compressed air is connected to an inner lancing tube which extends through the outer tube and terminates in a discharge in the fluid bed area of the furnace. In addition, the outer tube is connected to a fuel supply and the second source of compressed air is regulated in accordance with the pressure conditions in the inner tube in order to regulate the pressure to provide adequate fuel feeding.

7 Claims, 1 Drawing Figure

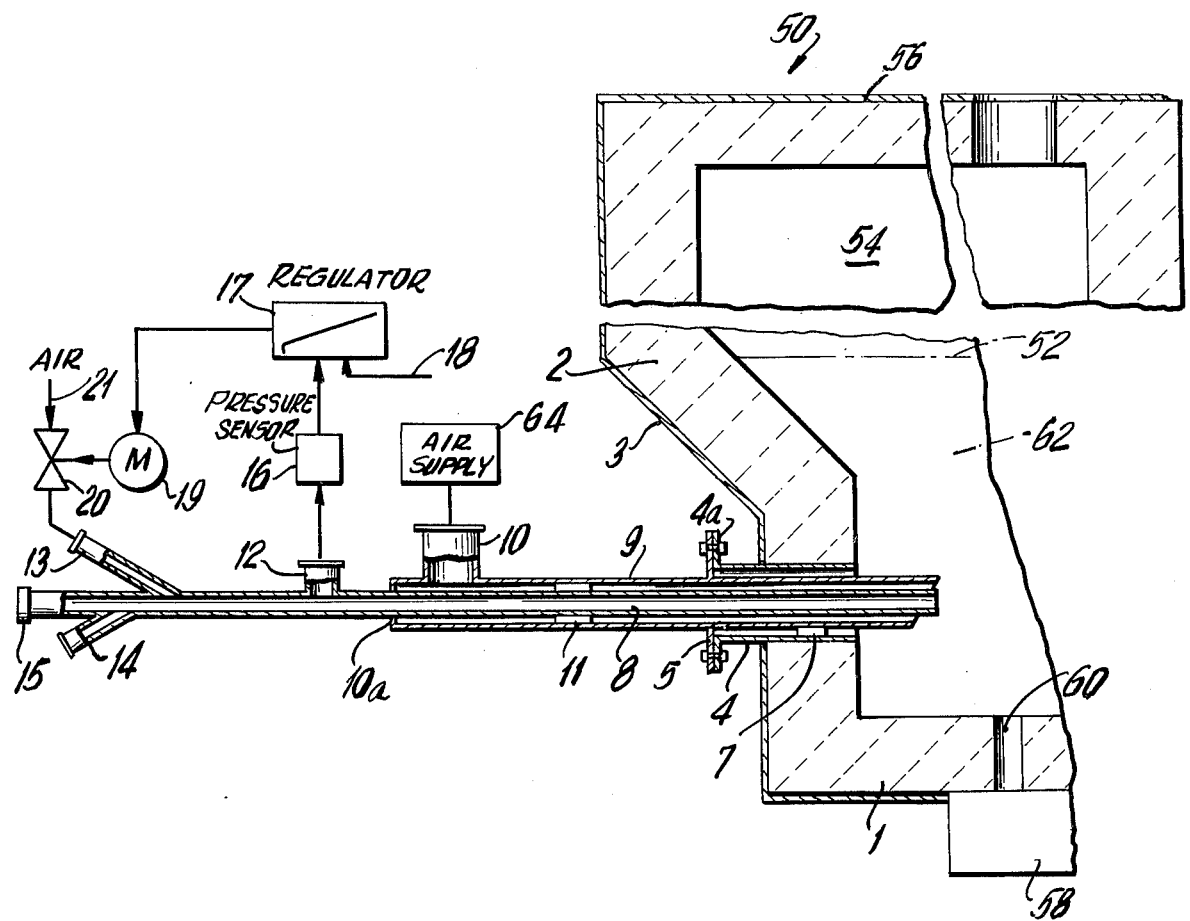

FLUIDIZED BED FURNACE HAVING FUEL AIR SUPPLY LANCE AND A FUEL AIR SUPPLY LANCE CONSTRUCTION

FIELD AND BACKGROUND OF THE INVENTION

This invention relates in general to the construction of furnaces and, in particular, to a new and useful fluidized bed furnace and a lance construction therefor.

DESCRIPTION OF THE PRIOR ART

The present invention is particularly applicable to the construction of a fluidized bed furnace in which a bed of solid particles is fluidized by air blown in through a bottom wall. A lance of a type which permits the directing of fuel into the bed in order to facilitate the combustion of the sludge is known, for example, in the periodical "Brennstoff-Warme-Kraft" (Fuel-Heat-Power), 1966, pages 231 to 235 which describes lances which are used particularly for burners having to start combustion processes and for burners which function as supplemental burners. In principle, the combusion operation has to be automatic. However, if this is not permissible for reasons of a too high water content of the sludge to be burned, an additional heating can be provided with the aid of lances. It is well known that even waste oil can be burned in such a fluidized bed furnace so that for maintaining heat balance, not only is it not necessary to use external heat in the form of, for example, fuel oil, but further, the waste material which has a higher calorific value, such as particularly waste oil, may be added to the sludge in a higher proportion.

SUMMARY OF THE INVENTION

The invention provides a lance in which oil may be fed to the fluidized bed of the burning sludge material and, if necessary, may provide an additional heating device which may be operated for a long period of time without disturbance and which also permits an undisturbed operation with waste oil. Disturbances may occur in such a lance primarily by causing a cracking of the fuel at high temperatures. In intermittently operated lances, which are the concern of the present invention, disturbances of this kind are very frequent. It recently has been found that such disturbances can be avoided by maintaining a very high flow velocity within the lance. This favorable effect can be further supported by measures which keep the lance cool. In accordance with the invention, the lance is provided with a further connection which leads through an adjustable valve to a second compressed air line so that additional compressed air may be fed into the lance as soon as the feeding of the oil drops off. It is particularly advantageous if the lance is disposed so as to extend approximately horizontally through the furnace wall in the zone of the fluidized bed.

In a lance of the design of the invention, it is possible, by adding compressed air to the oil feed which must be effected under a pressure corresponding to the pressure of the compressed air, in order to maintain a very high velocity during the operation and, particularly, also during periods when the heating of the oil is reduced or even stopped. In the cases where the oil feeding is stopped, the lance is operated only with air. With the intended use of the lance in a fluidized bed, the flow velocity may be chosen very high without running the risk of breaking of the flame because a sufficient volume of combustion air is present in the fluidized bed for the fuel oil fed in. Consequently, there is no need for a special design of the furnace end of the inventive lance and, in fact, this end may be formed with a straight cut-off end portion.

Instead of the fuel oil, other fuels, such as coal dust or gaseous hydrocarbons, may also be used. It is particularly advantageous for this purpose to use waste oil which must be destroyed anyway. Due to the possibility of securely avoiding a cracking of the added fuels in the hot zone of the lance, the inventive lance ensures an undisturbed operation in any case and over long periods of time.

A permanent, sufficiently high flow velocity within the lance is best insured by providing an opening for a pressure pick-off between the two outer connections and the location where the lance exends through the furnace wall and by connecting the pressure pick-off to a pressure regulator controlling the compressed air supply to the lance through an adjusting member which is connected so as to have a desired value input for regulating it. By using a desired value input, a setpoint is adjusted for the pressure corresponding to the flow velocity at which the cracking phenomena may be securely avoided. As long as the pressure thus adjusted, or a higher pressure is maintained during the operation of the inventive lance with oil or another fuel, the compressed air supply is stopped by means of a pressure regulator. On the other hand, if the pressure provided for the fuel feed drops below the set value, the compressed air will be added to compensate for the pressure drop. In the inventive arrangement, a valve between the compressed air connection at the lance pipe and the compressed air supply is regulated in accordance with the pressure which is sensed downstream in the same lance pipe and its deviation from a desired value as set into the controller.

In principle, the inventive lance is suitable for any kind of operation in which the flow velocity is sufficiently high to ensure that there will be no cracking of the fuels. This operation is supported by measures serving to effect cooling of the lance. In a preferred form, the lance is disposed centrally within an outer jacket tube and is supported in spaced relationship from the surrounding tube by spacers. Both the jacket tube and the lance extend through the furnace wall and the outer jacket is advantageously connected to a first compressed air supply. This compressed air is supplied to the outer jacket tube in order to provide a cooling effect on this tube and the lance therewithin.

Should solid particles pass into the lance tube along with the material to be burned, or should cracking occur due to an error of operation or supply disturbance, a push rod may be used which may be pushed through a plug connection after the plug is removed so that it moves the entire length of the lance and into the furnace. This means that the lance may be easily cleaned of any extraneous matter.

Accordingly, it is an object of the invention to provide an improved fluidized bed furnace having a connection adjacent the fluidized bed zone in the form of a connection socket which is sealed with and supports an outer tube having a connection to a compressed air supply and which in turn supports an inner lance tube in spaced relation to its interior wall which is connectable to a separate compressed air supply and to a fuel supply and wherein the separate compressed air supply is regulated in accordance with the pressure conditions within the inner tube in order to provide an adequate fuel feeding.

A further object of the invention is to provide an improved lance tube for a fluidized bed furnace which includes an inner lance tube arranged within an outer tube which is connected to have an air flow therethrough and wherein the inner tube or lance is provided with connection for both fuel and air with means for regulating the air supply in accordance with the pressure conditions therein.

A further object of the invention is to provide a fluidized bed furnace and a lance tube construction which are simple in design, rugged in construction and economical to manufacture.

For an understanding of the invention, reference is made to the following description of a typical embodiment thereof as illustrated in the accompanying drawing.

BRIEF DESCRIPTION OF THE DRAWING

The only FIGURE of the drawing is a partial sectional view of a fluidized bed furnace with a lance constructed in accordance with the invention.

DESCRIPTION OF THE PREFERRED EMBODIMENT

Referring to the drawing in particular, the invention embodied therein, comprises a fluidized bed furnace, generally designated 50, which includes a bottom 1 over which a fluidized bed is formed up to a level, for example, at 52 and which includes a combustion chamber 54 defined above fluidized bed 52 and below a furnace roof 56. Air is supplied through a wind box 58 and nozzles 60 through the bottom 1 in order to maintain the fluidized bed 62. The furnace wall means includes a furnace side wall 2 having a refractory lining and an outer sheet metal shell 3.

In accordance with the invention, a tubular socket connection 4 extends into the side wall 2 above the bottom 1 in the area of the fluidized bed 62 and it is supported on a support 7 of the furnace. The tubular socket includes an end flange 4a which is secured to an end flange 5 of an outer or first tubular member 9 which extends at its inner end into the fluidized bed 62 and it is sealed with the connection socket 4. The outer tube is provided with a connection 10 to a first compressed air supply 64 and, in addition, its extreme outer end 10a is provided with an opening through which an inner tubular member or lance 8 is directed. Lance 8 is supported on spacers 11 at a spaced location from the interior of the outer tube or jacket 9. The outer tube includes an opening 12 for a pressure-measuring device which is connected to a pressure pick-off 16. The rear or outer end of the lance tube 8 is provided with a second compressed air connection 13 which extends through a control valve 20 having a control motor 19 and to a compressed air supply 21. A fuel connection 14 is also located to the rear of the second compressed air connection 13 at the tube 8. The pressure which is sensed by the pressure pick-up 16 is fed to a regulator or controller 17 for the control motor 19 of valve 21 and it supplies compressed air through the second compressed air connection 13 in accordance with the pressure which is sensed. The controller is also provided with an input 18 for controlling the pressure in the lance in accordance with a preset condition so that if the pressure sensed varies from this, the valve 20 will be either opened or closed accordingly. The rear end of the lance tube 8 is closed by a blind plug 15 which may be removed in order to permit the insertion of a push rod for cleaning the entire tube.

The inventive design makes it possible to maintain a permanently sufficient flow velocity and prevent the cracking of the fuel oil, and in addition, it makes it possible to control the supply of the fuel oil due to the aspirating or injector action of the compressed air which is fed in through the conduit connection 13 ahead of the fuel connection 14. This control for the fuel oil is more effective than a nozzle control which would be subjected to variations due to viscosity and other property changes in the fuel being fed.

The pressure value which is obtained by the pick-off 16 is converted to an electrical signal which is applied to the regulator 17. The desired value input 18 may be varied in accordance with operating characteristics and this value normally corresponds to the required minimal velocity at which cracking would be avoided. As soon as the pressure drops below this value, the regulator 17 starts the motor 19 to open valve 20 for the connection to the second compressed air supply 21.

While a specific embodiment of the invention has been shown and described in detail to illustrate the application of the principles of the invention, it will be understood that the invention may be embodied otherwise without departing from such principles.

What is claimed is:

1. A fluidized bed furnace particularly for burning sludges which have been dehydrated to some degree, comprising a housing having a bottom supporting a fluidized bed thereabove, wall means extending upwardly from said bottom above the fluidized bed and defining a combustion chamber thereabove, means for directing air through the bottom for maintaining the fluidized bed thereabove, a tubular connection socket connected into said wall means adjacent said bottom, a first outer tubular connection extending through said socket and supported and sealed therewith and terminating in an inner end extending into said furnace housing above said bottom in the area of said fluidized bed, said first outer tubular connection having a first compressed air connection adjacent its opposite outer end, a second inner tube extending through said first outer tubular connection and having an inner end terminating in a discharge in said furnace, and having an opposite outer end with a separate second compressed air connection, a fuel connection adjacent said opposite outer end of said second inner tube, pressure-sensing means in said second inner tube downstream of said second compressed air connection and said fuel connection, said sensing means being connected to said second compressed air connection to regulate the supply of air thereto in accordance with the pressure which is sensed.

2. A fluidized bed furnace, according to claim 1, wherein said lance tube extends horizontally through said wall means in the zone of said fluidized bed.

3. A fluidized bed furnace, according to claim 1, wherein said second compressed air connection is located downstream of said fuel connection and said pressure pick-off connection is located downstream of said second compressed air connection, said sensing means including a regulator, said second compressed air connection having a valve control connected to said regulator, means for applying an input value to said regulator for controlling the operation of said valve, said regulator acting in accordance with variation of pressure sensed by said sensing means and in accordance with the value of said input to regulate the opening of said valve.

4. A fluidized bed furnace, according to claim 1, wherein said first outer tubular connection extends into said furnace away from the interior walls thereof, said second tube extending with its inner end substantially to the inner end of said first outer tubular connection.

5. A fluidized bed furnace, according to claim 1, wherein said inner tube includes an outer end with a removable plug which may be removed to permit insertion of a cleaning tool therethrough.

6. A lance assembly for a fluidized bed furnace, comprising a first outer tubular member adapted to extend through the wall of the furnace and be sealed therewith and having an inner end adapted to be located within the furnace, said outer tubular member having a connection to a first pressure air supply, an inner tubular lance member located within and spaced from the interior walls of said outer tubular member and having an inner end terminating adjacent the inner end of said outer tubular member, said inner tubular member having a second pressure air supply connection, a fuel connection, and a pressure-sensing connection downstream of said fuel and compressed air connection, control means in said second pressure air connection connected to said pressure-sensing connection and being responsive to pressure-sensing for regulating the air flow through said inner tubular member.

7. A lance assembly for a fluidized bed furnace, according to claim 6, wherein said inner tubular member is provided with an outer end exteriorly of the outer end of said tubular member having a removable plug.

* * * * *